Patented Mar. 7, 1939

2,149,280

UNITED STATES PATENT OFFICE 2,149,280

PREPARATION OF AROMATIC DINITRILES

Arden Garrell Deem, Wilmington, and Wilbur Arthur Lazier, Elsmere, Del., assignors to E. I. du Pont de Nemours & Company, Wilmington, Del., a corporation of Delaware No Drawing. Application May 29, 1937,
Serial No. 145,508

8 Claims. (Cl. 260—465)

This invention relates to the manufacture of aromatic mono- and dinitriles from aromatic dicarboxylic acids and from such derivatives thereof as may be produced by the reaction of ammonia with aromatic dicarboxylic acids or anhydrides. In its more limited aspects this invention relates to an improved catalytic process for the preparation of benzonitrile and o-phthalonitrile from phthalic acid, anhydride, amide or imide.

In U. S. Patent No. 2,054,088 to Linstead and Lowe, issued September 15, 1936, there is disclosed a catalytic process for the manufacture of aryl dinitriles which comprises passing a gaseous mixture of ammonia and an ortho- or peri-aromatic dicarboxylic acid, anhydride, amide or imide over a suitable dehydrating catalyst at elevated temperatures. As dehydrating catalysts are mentioned silica, alumina and thoria. In a continuing application Serial No. 94,284, filed August 4, 1936, the same inventors further disclosed that by adhering to certain specific operating conditions of temperature, time of contact, and ammonia-concentration, the reaction may be controlled to give the main product in high yields and essentially free from by-products. On the other hand, it has been established that under certain conditions the above process yields substantial amounts of aromatic mononitriles in addition to aromatic dinitriles (cf. copending application of Howk and Wortz, Serial No. 95,035, filed August 8, 1936).

The present invention is in the nature of an improvement upon said prior processes, and has as its object to provide a catalyst which is particularly efficient, economic and durable under the conditions of operation.

We have found that if phthalic acid, anhydride, amide, or imide and ammonia are reacted in the gas phase while passing over a catalyst consisting of basic aluminum phosphate, basic aluminum sulfate, or mixtures of the two, heated to a temperature between 300 and 550° C., the reaction assumes several advantageous aspects which were not to be foreseen from a mere study of the above cited prior art. In the first place, we have found that when a catalyst comprising basic aluminum phosphate is employed the reaction is readily controllable to produce high yields of dinitrile in a high state of purity. Secondly, we have found that basic aluminum phosphate, basic aluminum sulfate, and mixtures of the two are particularly sturdy, and give consistently high yields under continuous use, whereas with other dehydrating catalysts the yield tends to drop off after prolonged use. Furthermore, while some of the other dehydrating catalysts decompose or lose their activity upon regeneration, the preferred catalysts of our invention may be repeatedly regenerated with substantially no loss in catalytic activity. This is a very important property of aluminum phosphate catalysts from a practical point of view since it reduces catalyst costs. Altogether then, our invention renders the entire process particularly economical when practiced on a commercial scale.

"Basic aluminum phosphate" as employed in this application refers to the hydrate of aluminum phosphate obtainable by precipitating an aqueous solution of alum or aluminum sulfate with a solution of a water-soluble phosphate. More generally, however, the precipitate is not pure hydrated aluminum phosphate but is admixed with aluminum sulfate or basic aluminum sulfate. For want of a standard term, we shall refer generically to all such compositions, whether consisting of pure aluminum phosphate hydrate or admixed with sulfates of aluminum, as "phosphated-alumina hydrate". A typical commercial product of this series possesses the following composition:

| | Percent |
|---|---|
| $Al_2O_3$ | 38 to 40 |
| $SO_3$ | 10 to 14 |
| $P_2O_5$ | 15 to 17 |
| $Na_2O$ | 0.1 to 0.2 |
| Fe | 0.03 to 0.048 |

Without limiting our invention to any particular procedure, the following examples are given to illustrate our preferred mode of operation. Parts mentioned are by weight, unless otherwise stated.

Example 1

A vigorous stream of ammonia is passed at the rate of 255 liters per hour through a tube containing 500 cc. of a basic aluminum phosphate catalyst, which is in the form of small pellets. The catalyst is maintained at a temperature of 450° C. 1187 grams of o-phthalimide are vaporized, and introduced into the ammonia stream at the rate of 99 grams per hour. The vapor stream issuing from the tube is passed into a cooled receiver where the product separates as a finely divided powder. Water vapor is vented to a separate trap. This powder is stirred with approximately 5 times its weight of warm benzene until no more of the solid dissolves. Filtration removes 42 grams of unchanged o-phthalimide corresponding to 2.7% of the amount charged. The filtrate is cooled and o-phthalonitrile separates in white needles, M. P. 140-141° C. The benzene solution is steam distilled to yield, in addition to solvent, 0.9% of benzonitrile. The solid residue is recrystallized from hot water to recover the remainder of the o-phthalonitrile. This in combination with that which crystallized from benzene amounts to 951 grams, which represents a molecular yield of 91.6%. An alternative method of refining, which yields o-phthalonitrile of reasonably good quality, comprises extracting the crude powder with cold 5% caustic soda solution to dissolve phthalimide and other alkali soluble by-products. The mixture is filtered, the filter cake washed thoroughly with cold water, and dried. If so desired, this product is further refined by distillation or sublimation.

A basic aluminum sulfate catalyst when employed under the above conditions, gives equally good results, either alone or when admixed with basic aluminum phosphate.

Example 2

A stream of ammonia is passed at the rate of 4.25 liters per minute through a tube containing 500 cc. of a basic aluminum phosphate catalyst maintained at 450° C. 1212 grams of o-phthalic anhydride are vaporized, and introduced into the ammonia stream at the rate of about 100 grams per hour. In traversing the catalyst bed, the o-phthalic anhydride-ammonia mixture is converted mainly to o-phthalonitrile, o-phthalimide, and water. The products are condensed in a suitable receiver as a slightly damp, pale-green powder. The mixture is treated with boiling benzene, and filtered to separate 64.8 grams of o-phthalimide. Fractional distillation of the benzene extract gives, after removing the solvent, 3.54 grams of benzonitrile, and 985 grams of pure o-phthalonitrile, M. P. 141° C. The molecular conversion to benzonitrile, o-phthalonitrile, and o-phthalimide are 0.42%, 94%, and 5.3%, respectively.

The ammonia ratio in the above example was 16.8 and the contact time 2.52 seconds.

Example 3

A vapor mixture of o-phthalimide and ammonia containing 6.9 mols of ammonia per mol of o-phthalimide is passed over 500 cc. of a phosphated-alumina-hydrate catalyst (for instance, the commercial catalyst having the composition hereinabove tabulated) heated to 475° C. During a period of 12 hours, 1383 grams of o-phthalimide are treated in this manner. The products are condensed and worked up according to the procedure described in Example 2, above. There is obtained 29.5 grams of unchanged o-phthalimide, 1165 grams of o-phthalonitrile, and 1.1 grams of benzonitrile. The conversion to o-phthalonitrile is 88.3% of theory. The contact time is 4.70 seconds.

Example 4

664 grams of o-phthalimide are processed according to the above procedure under the following conditions:

Ratio of ammonia to o-phthalimide____ 13.9
Duration of run_____hours__ 6
Catalyst volume_____cc____ 500
Catalyst_____Phosphated-alumina-hydrate
Temperature_____ 475° C.
Contact time_____seconds__ 2.61

The products obtained consisted of 14.6 grams of unchanged o-phthalimide, 531 of o-phthalonitrile, and less than 1 gram of benzonitrile. The conversion to o-phthalonitrile is 91.9% of theory.

Example 5

25,020 grams of o-phthalimide are processed according to the procedure described under Example 4, above, under the following conditions:

Ratio of ammonia to o-phthalimide____ 13.5
Duration of run_____hours__ 220
Catalyst volume_____cc____ 500
Catalyst_____Phosphated-alumina-hydrate
Temperature of reaction_____ 450 to 475° C.
Contact time_____seconds__ 2.62

The average conversion to o-phthalonitrile in the above experiment was 87.4% of theory.

Example 6

500 cc. of hydrated aluminum sulfate catalyst in the form of pellets is charged into a vertically mounted catalyst tube and heated to a temperature of 425° C. Ammonia is passed through the catalyst bed at the rate of 0.15 cu. ft. per minute (Standard temperature and pressure). o-Phthalimide is vaporized and passed in with the ammonia at the rate of 1.83 grams per minute during a period of 12 hours. Under these conditions the ammonia-phthalimide ratio is 14:1 and the contact time 2.8 seconds. The gaseous products issuing from the catalyst tube are condensed to form a faintly yellow powder which is treated according to the procedure of Example 1 to remove o-phthalonitrile, unchanged o-phthalimide, and benzonitrile. From 1315 grams of o-phthalimide processed, there is obtained 1048 grams of o-phthalonitrile, 49.9 grams of phthalimide, and 8.3 grams of benzonitrile. These amounts correspond to molecular yields of 91.5%, 3.8%, and 0.9% respectively. Similar results are obtained in retesting the catalyst after regenerating by treating with air at elevated temperatures.

For the sake of comparison, we are tabulating below a number of miscellaneous dehydrating catalysts tested by us under various conditions, and the yields thus obtained. It will be noted that basic aluminum phosphate gives superior yields to each and every one of them.

may be carried out at elevated catalyst temperatures ranging from about 300° C. to about 550° C.

| Starting material | Time | Temperature | Catalyst | | Vapor passed per hour | Ammonia passed per hour | Total gas passed per hour | NH₃ ratio | Space velocity | Time of contact | Percent conversion and yield to— | | |
|---|---|---|---|---|---|---|---|---|---|---|---|---|---|
| | | | Type | Volume | | | | | | | Phthalimide | o-Phthalonitrile | Benzonitrile |
| | Hours | °C. | | Liters | Grams | Liters | Liters | | | Sec. | | | |
| Phthalic anhydride | 5.0 | 400 | Alumina-on-silica gel | 0.5 | 104.4 | 271.6 | 287.4 | 18.0 | 575 | 2.5 | 29.7 | 60.7 | 0.0 |
| Do | 3.1 | 400 | Tungsten oxide | 0.5 | 118.8 | 271.6 | 289.9 | 15.0 | 580 | 2.5 | 18.9 | 69.8 | 5.1 |
| Do | 12.0 | 500 | Thoria | 0.5 | 108.6 | 237.7 | 254.2 | 14.5 | 510 | 2.5 | 3.0 | 20.5 | 55.0 |
| Do | 9.3 | 400 | Activated carbon | 0.5 | 108.6 | 271.6 | 288.1 | 17.7 | 578 | 2.5 | 76.5 | 16.4 | 6.0 |
| Do | 10.8 | 400 | Chromic oxide | 0.5 | 119.4 | 271.6 | 289.7 | 15.0 | 580 | 2.5 | 11.6 | 46.2 | 21.4 |
| Do | 12.0 | 400 | Vanadium oxide-on-alundum | 0.5 | 106.8 | 271.6 | 287.8 | 16.9 | 576 | 2.5 | 38.2 | 61.9 | 4.6 |
| Do | 12.0 | 400 | Titania | 0.5 | 109.2 | 271.6 | 288.2 | 16.5 | 578 | 2.5 | 19.8 | 54.2 | 16.0 |
| Do | 12.0 | 400 | Beryllia-on-carbon | 0.5 | 101.4 | 271.6 | 287.0 | 17.7 | 575 | 2.5 | 32.5 | 63.2 | 1.1 |
| Do | 12.0 | 400 | Molybdenum oxide | 0.5 | 109.8 | 271.6 | 288.3 | 16.0 | 579 | 2.5 | 65.5 | 36.2 | 0.8 |
| Do | 11.2 | 400 | Zirconium oxide-on-carbon | 0.5 | 93.0 | 271.6 | 285.7 | 19.2 | 572 | 2.5 | 14.7 | 72.0 | 3.0 |
| Do | 11.7 | 400 | Alumina | 0.5 | 101.4 | 271.6 | 287.0 | 17.7 | 575 | 2.5 | 23.7 | 68.7 | 4.4 |
| Do | 11.5 | 400 | Potassium alum | 0.5 | 112.2 | 271.6 | 288.6 | 16.0 | 579 | 2.5 | 34.8 | 63.8 | 0.2 |
| Do | 12.0 | 500 | Iron oxide-on-silica gel | 0.5 | 116.4 | 254.7 | 272.4 | 14.6 | 552 | 2.3 | 4.0 | 67.3 | 28.0 |
| Do | 11.9 | 500 | Zinc chromite | 0.5 | 99.0 | 254.7 | 270.4 | 17.3 | 542 | 2.3 | 0.1 | 9.6 | 50.5 |
| Do | 12.0 | 500 | Silica gel | 0.5 | 109.7 | 255.0 | 271.8 | 15.1 | 544 | 2.3 | 15.9 | 70.0 | 10.6 |

In addition to giving superior yields, phosphated-alumina-hydrate catalysts have the advantage, already noted above, of standing up well under continued use, and of being capable of regeneration without any appreciable loss in catalytic activity.

The regeneration of the catalysts employed in this invention is effected by burning off the carbonaceous deposits at an elevated temperature in a stream of an oxygen-containing gas. This process may be carried out either in situ or by removing the spent catalyst to a separate muffle furnace. Phosphated-alumina-hydrate catalysts revivified in this manner are essentially equivalent to fresh, unused catalysts as is shown by the following example:

*Example 7*

A 500 cc. sample of phosphated-alumina-hydrate catalyst is revivified after 230 hours of continuous use in the preparation of ortho-phthalonitrile from ortho-phthalimide, by combustion of the carbonaceous deposits in a stream of air at 450 to 500° C. This catalyst is then again used in the conversion of ortho-phthalimide to ortho-phthalonitrile, for instance, as follows:

The converter tube and catalyst are maintained at a temperature of 475° C. while passing ammonia at the rate of 3.9 liters per minute. Vaporized ortho-phthalimide is passed in with the ammonia at the rate of 115.5 grams per hour. Upon working up the product from 1385 grams of ortho-phthalimide according to the procedure described in Example 1, there is obtained 83.5 grams of unchanged ortho-phthalimide and 1063 grams of ortho-phthalonitrile. These values correspond to molecular conversion of 6.1% and 88.2%, respectively, showing that the phosphated-alumina hydrate catalyst has suffered little or no deterioration through prolonged use.

It will be understood that the above examples are given merely for the purpose of illustration, and that this invention is capable of wide variation and modification without departing from the spirit thereof.

Broadly speaking, the process of this invention

In the foregoing examples we have mentioned three other important variables: space velocity, time of contact, and ammonia ratio.

The space velocity and time of contact are interdependent variables and serve as a measure of the rate at which the gaseous reactants pass through the catalyst. "Space velocity" is defined as the number of volumes of gas, calculated as at standard conditions, that pass through a unit volume of catalyst in 1 hour. "Time of contact" is defined as the time in seconds that is required by the gaseous reactants to traverse the entire space occupied by the catalyst at the temperature and pressure of the reaction, assuming no change in volume. The time of contact and space velocity may be calculated from each other by the following expression:

$$\text{Time of contact} = \frac{273 \times 60 \times 60}{(273 + \text{Temp. in °C.}) \times \text{space velocity}}$$

In the practice of this invention it is most advantageous to operate with contact times ranging from about 2 seconds to about 12 seconds.

The "ammonia ratio" is an expression of the relative concentrations of ammonia and phthalic anhydride, acid, amide, imide, etc., that are maintained in the reaction chamber during the reaction. A numerical value for ammonia ratio is obtained by dividing the number of mols of ammonia passed per unit of time by the number of mols of phthalic anhydride, etc., passed per unit of time. In practice, we prefer to use a molal excess of ammonia ranging from about 6 to about 20 times that theoretically required.

The process of this invention is broadly applicable to aromatic dicarboxylic compounds that are capable of reacting with ammonia to produce diamides or imides. In addition, to phthalic acid and its derivatives the process may be applied successfully to other aromatic dicarboxylic compounds such as terephthalic acid, 1,8-naphthalic anhydride, chlorophthalic anhydride, etc., producing the respective dinitriles.

Other variations and modifications will be readily apparent to those skilled in the art.

We claim:

1. A process for the manufacture of aryl dinitriles which comprises heating a gaseous mixture comprising a molecular excess of ammonia and a member of the group consisting of ortho-phthalic acid, ortho-phthalic anhydride, phthalamic acid, phthalimide, and phthalamide at a temperature between 300 and 550° C. for a period of time between about 2 seconds and about 12 seconds in the presence of a catalyst selected from the group consisting of basic aluminum phosphate, basic aluminum sulfate, and mixtures of the two.

2. A process as in claim 1, in which the quantity of ammonia is at least 6 times the amount theoretically required to react with the organic compound undergoing conversion to phthalonitrile.

3. The process of producing an aromatic ortho-dinitrile of the benzene series which comprises passing a gaseous mixture of an ortho-dicarboxylic acid imide of the benzene series and an excess of ammonia in contact with a catalyst comprising essentially hydrated aluminum phosphate at a temperature between about 400 and 500° C. and at a time of contact between about 2 and 12 seconds.

4. The process of claim 3 in which the molecular ratio of ammonia to the aromatic dicarboxylic imide is between 6 and 20.

5. The process which comprises passing a mixture of phthalimide vapor and excess ammonia over a hydrated aluminum phosphate-aluminum sulfate catalyst, heated at a temperature between 400 and 500° C., at such a rate that a contact time between 2 and 12 seconds is maintained, and thereafter separating water and unreacted ammonia from the recovered phthalonitrile.

6. The process of producing phthalonitrile, which comprises passing a mixture of ammonia and phthalimide in a molal ratio of between 6 and 20, at a temperature between 400 and 500° C. over heated hydrated aluminum phosphate, the rate of flow of gases being controlled so that the resulting contact time is between 2 and 12 seconds.

7. The process of producing phthalonitrile, which comprises passing a mixture of ammonia and phthalic anhydride in a molal ratio of between 6 and 20, at a temperature between 400 and 500° C. over heated hydrated aluminum phosphate, the rate of flow of gases being controlled so that the resulting contact time is between 2 and 12 seconds.

8. The process of producing phthalonitrile, which comprises passing a mixture of ammonia and phthalimide in a molal ratio of between 6 and 20, at a temperature between 400 and 500° C. over heated hydrated aluminum sulfate, the rate of flow of gases being controlled so that the resulting contact time is between 2 and 12 seconds.

ARDEN GARRELL DEEM.
WILBUR ARTHUR LAZIER.